(12) United States Patent
Ota et al.

(10) Patent No.: US 11,718,259 B2
(45) Date of Patent: Aug. 8, 2023

(54) SIDE AIRBAG APPARATUS

(71) Applicants: TOYODA GOSEI CO., LTD., Kiyosu (JP); TOYOTA JIDOSHA KABUSHIKI KAISHA, Toyota (JP)

(72) Inventors: Shohei Ota, Kiyosu (JP); Koji Shibayama, Kiyosu (JP); Masanori Fukuoka, Seto (JP); Tomoya Takeuchi, Anjo (JP)

(73) Assignees: TOYODA GOSEI CO., LTD., Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 17/276,984

(22) PCT Filed: Sep. 13, 2019

(86) PCT No.: PCT/JP2019/036009
§ 371 (c)(1),
(2) Date: Nov. 1, 2021

(87) PCT Pub. No.: WO2020/066677
PCT Pub. Date: Apr. 2, 2020

(65) Prior Publication Data
US 2022/0161752 A1    May 26, 2022

(30) Foreign Application Priority Data
Sep. 25, 2018   (JP) .................. 2018-178546

(51) Int. Cl.
*B60R 21/207*   (2006.01)
*B60R 21/231*   (2011.01)
(Continued)

(52) U.S. Cl.
CPC ........ *B60R 21/207* (2013.01); *B60R 21/0136* (2013.01); *B60R 21/23138* (2013.01);
(Continued)

(58) Field of Classification Search
None
See application file for complete search history.

(56) References Cited

U.S. PATENT DOCUMENTS 10,035,485 B2 *   7/2018   Fujiwara ............... B60R 21/207
10,035,488 B2 *   7/2018   Nagata .................. B60R 21/207
(Continued)

FOREIGN PATENT DOCUMENTS

JP   2009-035089 A   2/2009
JP   2009-184646 A   8/2009
(Continued)

OTHER PUBLICATIONS

International Search Report of the International Searching Authority dated Oct. 8, 2019 for the corresponding international application No. PCT/JP2019/036009(and English translation).

*Primary Examiner* — Faye M Fleming
(74) *Attorney, Agent, or Firm* — Posz Law Group, PLC

(57) ABSTRACT

A side airbag apparatus is employed in a vehicle seat that includes a seat back and a seat belt guide. The seat back includes an accommodation portion in a lateral portion. The seat belt guide is attached to the lateral portion at a location above the accommodation portion. The side airbag apparatus includes a gas generator, an airbag, and a pressure receiving member. The gas generator and the airbag are installed in the accommodation portion. The pressure receiving member is arranged rearward of the airbag, and includes a main body and an upper restricting portion. The main body includes a pressure receiving surface, which extends along an axis of the gas generator. The upper restricting portion is located above and adjacent to the main body and includes an upper restricting surface located forward of an imaginary upward extension of the pressure receiving surface.

4 Claims, 6 Drawing Sheets

(51) Int. Cl.
  *B60R 21/264* (2006.01)
  *B60R 21/0136* (2006.01)
  *B60R 22/18* (2006.01)

(52) U.S. Cl.
  CPC ............ *B60R 21/264* (2013.01); *B60R 22/18* (2013.01); *B60R 2021/23146* (2013.01); *B60R 2022/1818* (2013.01)

(56) References Cited

U.S. PATENT DOCUMENTS

| | | | |
|---|---|---|---|
| 10,759,373 B2 * | 9/2020 | Okayama | ............ B60R 21/0136 |
| 2015/0367803 A1 * | 12/2015 | Fujiwara | ............... B60R 21/216 |
| | | | 280/728.2 |

FOREIGN PATENT DOCUMENTS

| | | | |
|---|---|---|---|
| JP | 2016-107887 A | 6/2016 | |
| JP | 2017-087949 A | 5/2017 | |

* cited by examiner

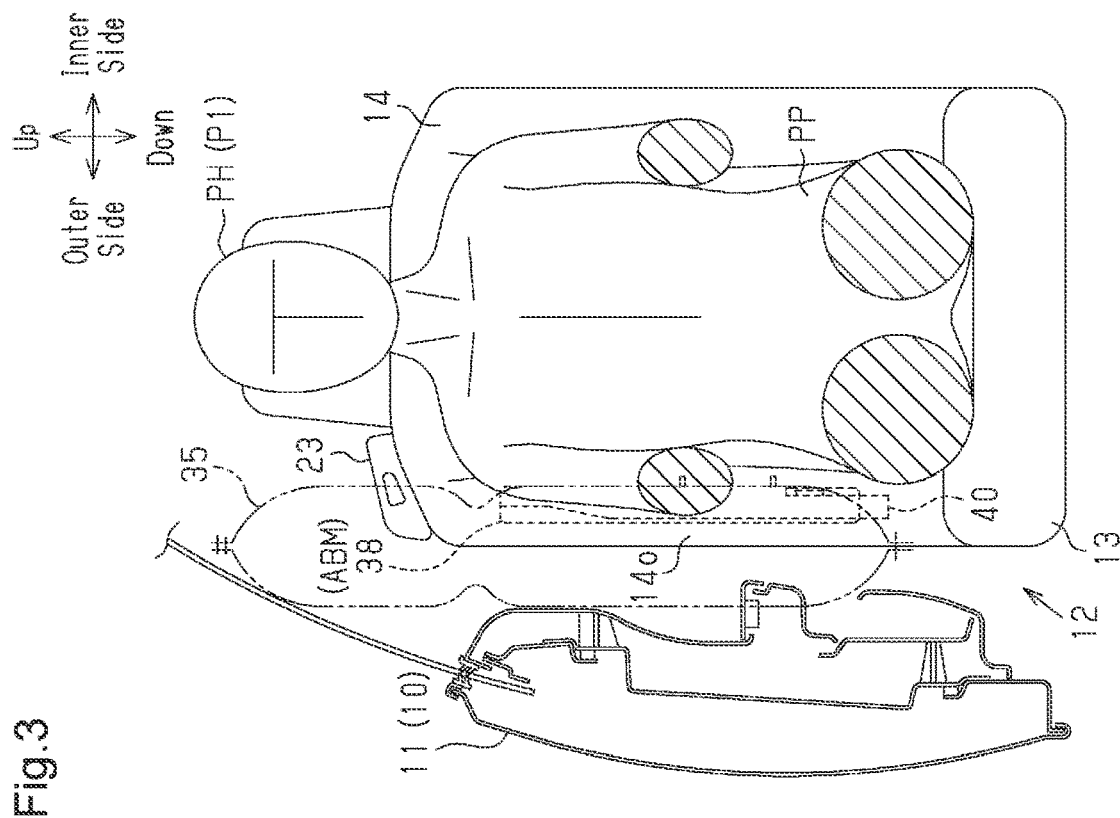

SIDE AIRBAG APPARATUS

CROSS REFERENCE TO RELATED APPLICATIONS

This application is a U.S. national stage application of International Patent Application No. PCT/JP2019/036009 filed on Sep. 13, 2019, which claims priority to Japanese Patent Application No. 2018-178546 filed on Sep. 25, 2018, the contents of which are incorporated herein by reference.

BACKGROUND

The present disclosure relates to a side airbag apparatus that protects an occupant seated in vehicle seat from an impact by causing an airbag to deploy and inflate between the occupant and a side wall of a vehicle when the impact force is applied to or is predicted to be applied to the side wall from the side.

A type of side airbag apparatus is widely known that has an airbag and a gas generator, and protects an occupant seated in a land vehicle seat from an impact when the impact force is applied to the side wall of the land vehicle from the side, for example, due to a side collision. The land vehicle seat that employs the side airbag apparatus includes an accommodation portion in the side of the seat back closer to the outside of the land vehicle. The accommodation portion incorporates an elongated gas generator in an upright state. The airbag is incorporated in the accommodation portion in a folded state.

When an impact force is applied to or is predicted to be applied to the side wall, the gas generator of the side airbag apparatus supplies inflation gas to the airbag. The inflation gas causes the airbag to deploy and inflate, causing the airbag to project from the seat back with a portion of the airbag remaining in the accommodation portion. Thereafter, the airbag continues to deploy and inflate between the occupant and the side wall. The deployed and inflated airbag is located between the occupant and the side wall, which bulges inward, to restrain the occupant and reduces the impact force transmitted to the occupant from the side through the side wall.

Patent Document 1 discloses one form of such a side airbag apparatus that includes a pressure receiving member (referred to as a support plate in Patent Document 1), which is arranged rearward of the airbag in the accommodation portion. The pressure receiving member has a pressure receiving surface, which extends along an axis of the gas generator. The pressure receiving member receives the pressure of inflation gas in the airbag on the pressure receiving surface and produces reaction force in a forward direction, which is perpendicular to the pressure receiving surface. The reaction force causes the airbag to quickly deploy and inflate forward. The airbag is thus capable of deploying and inflating in a narrow space between the occupant seated in the land vehicle seat and the side wall.

Patent Document 2 discloses one form of land vehicle seat that includes a seat belt guide attached to the outer side of the upper part of a seat back. The seat belt guide is located above the above-described accommodation portion.

PRIOR ART DOCUMENTS

Patent Documents

Patent Document 1: Japanese Laid-Open Patent Publication No. 2017-87949

Patent Document 2: Japanese Laid-Open Patent Publication No. 2009-35089

SUMMARY

A side airbag apparatus may be used to protect the head in addition to the lumbar region and the thorax of an occupant seated in a land vehicle seat having a seat belt guide attached to the seat back. This type of side airbag apparatus needs to cause an airbag to deploy and inflate to reach a higher position than in a case of a side airbag apparatus that does not protect the head.

In this respect, if the pressure receiving member disclosed in Patent Document 1 is employed in the side airbag apparatus disclosed in Patent Document 2, the pressure receiving member restricts rearward deployment and inflation of the airbag, while allowing upward deployment and inflation of the airbag. Thus, while deploying and inflating upward, the airbag contacts the seat belt guide, which is attached to the outer side of the upper part of a seat back, at a location above the accommodation portion. Since the space between the side wall and the seat belt guide is narrow, the airbag that has contacted the seat belt guide cannot easily continue to deploy and inflate upward through the space to deploy and inflate beside the head of the occupant, which is located above the seat belt guide.

The above-described drawbacks are not limited to land vehicle seats, but may also be found in any type of vehicle seats with a seat belt guide attached to the seat back.

It is an objective of the present disclosure to provide a side airbag apparatus that is capable of causing an airbag to deploy and inflate an airbag to a position above the seat belt guide.

To achieve the foregoing objective, a side airbag apparatus is employed in a vehicle seat that includes a seat back and a seat belt guide attached to the seat back. The seat back includes an accommodation portion in a lateral portion on an outer side. The seat belt guide is attached to the lateral portion at a location above the accommodation portion. The side airbag apparatus includes a gas generator, an airbag, and a pressure receiving member. The gas generator extends along an axis, is installed in an upright state in the accommodation portion, and generates inflation gas in response to an impact force applied to a side wall of a vehicle from a side. The airbag is installed in a folded state in the accommodation portion and inflates with the inflation gas supplied from the gas generator so as to deploy and inflate between an occupant seated in the vehicle seat and the side wall with a part of the airbag remaining in the accommodation portion. The pressure receiving member is arranged rearward of the airbag in the accommodation portion. The pressure receiving member includes a main body and an upper restricting portion. The main body includes a pressure receiving surface extending along the axis and receives pressure of the inflation gas in the airbag to produce a reaction force in a direction perpendicular to the pressure receiving surface. The upper restricting portion is located above and adjacent to the main body and includes an upper restricting surface located forward of an imaginary upward extension of the pressure receiving surface. The upper restricting portion restricts upward deployment and inflation of the airbag using the upper restricting surface.

With the above-described configuration, the gas generator, which is incorporated in the accommodation portion of the seat back, generates the inflation gas in response to an impact applied to the side wall of the vehicle from the side. When supplied with the inflation gas, the airbag inflates while being unfolded (deploying). At this time, the pressure of the inflation gas is received by the pressure receiving surface of the main body of the pressure receiving member in a section of the airbag that is located forward of the main body of the pressure receiving member. This produces reaction force in a direction perpendicular to the pressure receiving surface.

The gas generator, which extends along the axis, is incorporated in the accommodation portion in an upright state, and the pressure receiving surface extends along the axis. Thus, reaction force directed forward, which is a direction perpendicular to the pressure receiving surface, is produced in a section of the airbag that is located forward of the main body of the pressure receiving member. This section of the airbag deploys and inflates forward.

If the upper restricting portion were not provided above the main body, the airbag would not be restricted from deploying and inflating upward, although it would be restricted from deploying and inflating rearward by the main body. While deploying and inflating upward, the airbag would contact the seat belt guide, which is located above the accommodation portion. Since the space between the side wall and the seat belt guide is narrow, the airbag that has contacted the seat belt guide would not easily continue to deploy and inflate upward through the space to reach a position above the seat belt guide.

In this respect, the upper restricting portion is adjacent to and above the main body in the above-described configuration. The upper restricting surface of the upper restricting portion is located forward of an imaginary upward extension of the pressure receiving surface. Thus, the section of the airbag that is located forward of the upper restricting portion of the pressure receiving member and tends to deploy and inflate upward is restricted from continuing to deploy and inflate upward by the upper restricting surface before reaching the seat belt guide. This section of the airbag is restricted from passing through the narrow space between the seat belt guide and the side wall by the upper restricting portion. Thus, this section of the airbag deploys and inflates forward below the seat belt guide, and deploys and inflates upward after passing below the seat belt guide.

In the above-described side airbag apparatus, the upper restricting surface may be inclined relative to the axis by a constant angle such that its upper end is farther forward from the axis than its lower end.

If the upper restricting surface meets the above condition, the upper restricting surface is located forward of an imaginary upward extension of the pressure receiving surface. The section of the airbag that is located forward of the upper restricting portion of the pressure receiving member and tends to deploy and inflate upward is restricted from continuing to deploy and inflate upward by the upper restricting surface, which is inclined by a constant angle in relation to the axis, before reaching the seat belt guide, so that the direction of the deployment and inflation is changed from an upward direction to a forward direction.

The above-described side airbag apparatus may further include a reinforcing rib that is formed at least in a part, in a direction along the axis, of at least one of opposite edges of the pressure receiving member in a width direction of the vehicle seat. The reinforcing rib may protrude in a thickness direction of the pressure receiving member.

Since the reinforcing rib is provided in a section that meets the above condition, the shape stiffness of the pressure receiving member is increased as compared to a case in which the reinforcing rib is not provided. The pressure receiving member resists deformation when receiving the pressure of the inflation gas in the airbag.

In the above-described side airbag apparatus, the reinforcing rib may protrude forward in the thickness direction from opposite edges of the main body in the width direction and from opposite edges of the upper restricting portion in the width direction. The airbag may be arranged between portions of the reinforcing rib in the width direction before being supplied with the inflation gas from the gas generator.

With the above-described configuration, when supplied with the inflation gas from the gas generator, the airbag inflates while being unfolded (deploying). The reinforcing rib, which is provided at the opposite edges of the main body in the width direction of the vehicle seat and at the opposite edges of the upper restricting portion in the same width direction restrict the airbag from deploying and inflating in the width direction of the vehicle seat.

Thus, the pressure receiving surface of the main body starts receiving the pressure of the inflation gas at an earlier stage than in a case in which the restriction is not performed by the reinforcing rib. Accordingly, reaction force in a direction perpendicular to the pressure receiving surface is produced at an early stage. The section of the airbag that is located forward of the main body of the pressure receiving member deploys and inflates forward at an earlier stage than in a case in which the restriction is not performed by the reinforcing rib.

The section of the airbag that is located forward of the upper restricting portion of the pressure receiving member is restricted from continuing to deploy and inflate upward by the upper restricting surface of the upper restricting portion at an earlier stage than in a case in which the restriction is not performed by the reinforcing rib. Thus, the direction of deployment and inflation of this section of the airbag is changed from an upward direction to a forward direction at an earlier stage than in a case in which the restriction by the reinforcing rib is not performed. This section deploys and inflates forward at an early stage below the seat belt guide, and deploys and inflates upward after passing below the seat belt guide.

In the above-described side airbag apparatus, the upper restricting portion may include an upper end that is located forward of the seat belt guide.

With the above-described configuration, the upper end of the upper restricting portion is located forward of the seat belt guide. Thus, the upper restricting portion restricts the section of the airbag that is located forward of the upper restricting portion of the pressure receiving member from deploying and inflating upward to a position forward of the seat belt guide.

The above-described side airbag apparatus allows the airbag to deploy and inflate to a position above the seat belt guide.

BRIEF DESCRIPTION OF THE DRAWINGS

FIG. 3 is a cross-sectional view as seen from the front of the land vehicle, illustrating the positional relationship of the land vehicle seat, the airbag, the occupant, and the side wall according to the embodiment.

FIG. 4 is a cross-sectional plan view partially showing the internal structure of a lateral portion on the outer side of the seat back, in which an airbag module and a pressure receiving member are installed, according to the embodiment.

DETAILED DESCRIPTION OF THE PREFERRED EMBODIMENTS

A side airbag apparatus for a front seat of a vehicle according to an embodiment will now be described with reference to the drawings. The vehicle is a land vehicle in the present embodiment.

The present embodiment assumes that the land vehicle is an open top car. The open top car includes a convertible having a roof made by a foldable top, a convertible having a roof made by a metal or plastic foldable roof, a T-bar roof car having a removable roof, and a targa top car.

In the following description, the direction in which the land vehicle advances will be referred to as the front, and the reverse direction will be referred to as the rear. The center in the width direction of the land vehicle (the vehicle width direction) is used as a reference. The side closer to the center in the vehicle width direction will be referred to as an inner side of the land vehicle, while the side farther from the center in the vehicle width direction will be referred to as an outer side of the land vehicle. It is also assumed that an occupant having a size equivalent to a crash test dummy is seated in a predetermined normal posture in the land vehicle seat.

Figure 1:
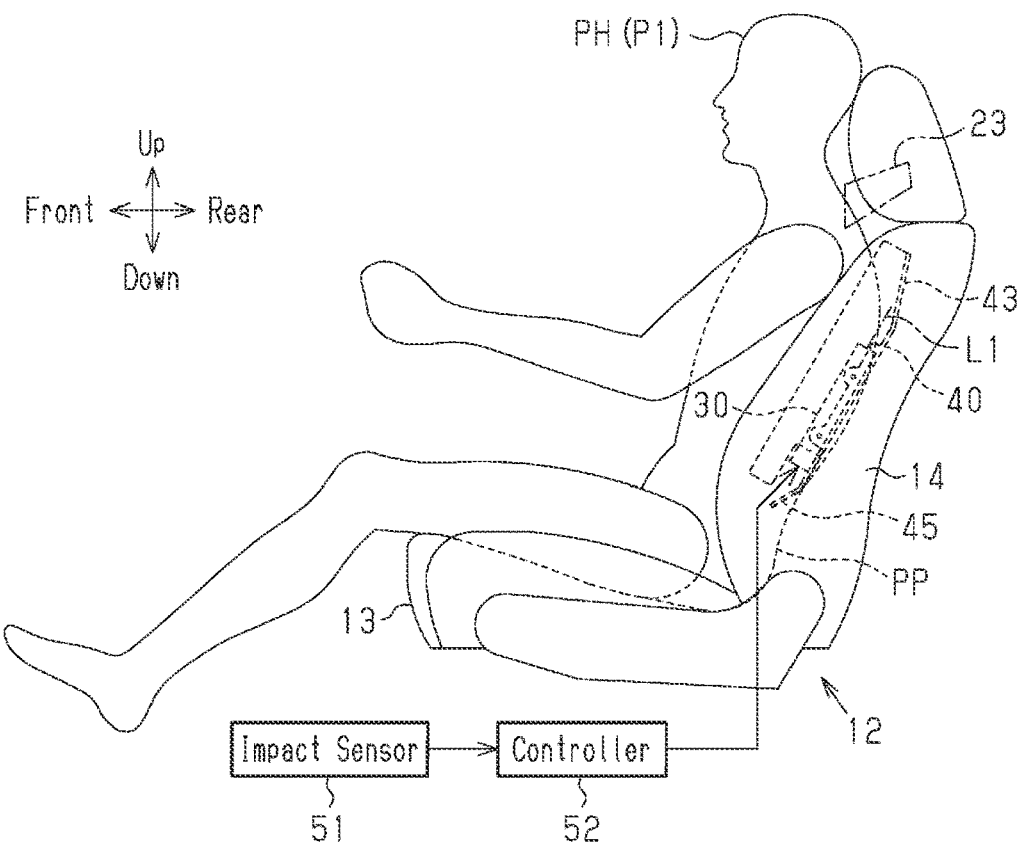
FIG. 1 is a side view illustrating, together with an occupant, a land vehicle seat equipped with a side airbag apparatus according to an embodiment.
Figure 2:
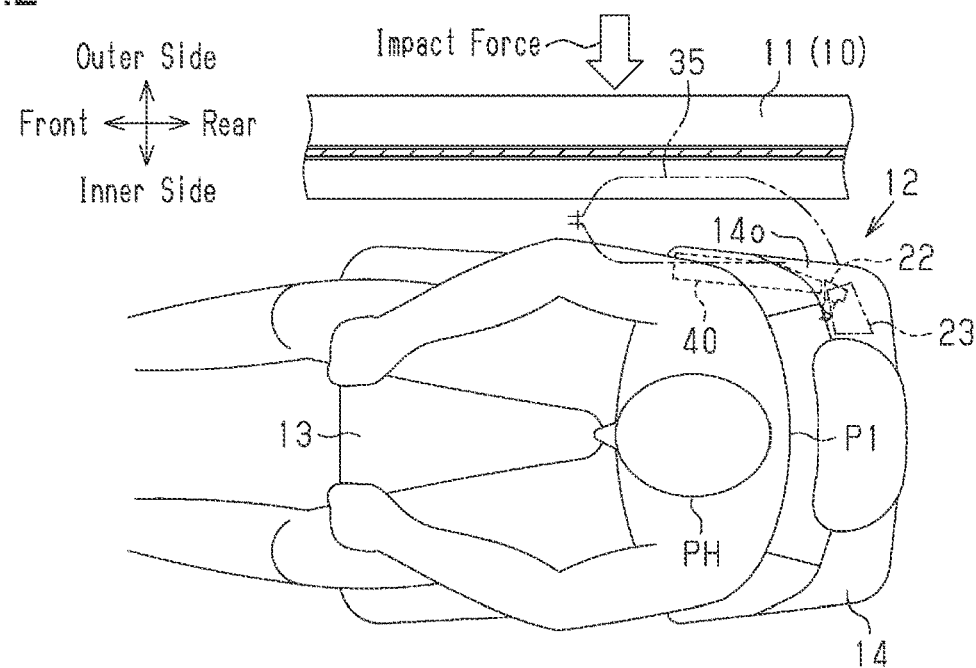
FIG. 2 is a cross-sectional plan view showing the positional relationship of the land vehicle seat, the airbag, the occupant, and a side wall according to the embodiment.

As shown in FIGS. 1 to 3, opposite sides in the vehicle width direction of a land vehicle 10 are each formed by a side wall 11. A part of each side wall 11 that corresponds to a front seat includes a front door and a center pillar (B-pillar).

The land vehicle 10 has a land vehicle seat 12, which is a vehicle seat, arranged in the vicinity of the inner side of the side wall 11. The land vehicle seat 12 is a front seat. The land vehicle seat 12 includes a seat cushion 13 and a seat back 14. The seat cushion 13 is attached to rails (not shown) installed on the floor of the vehicle body, so as to be adjustable in the front-rear position. The seat back 14 extends upward from the rear part of the seat cushion 13 and is inclined rearward. The seat back 14 is configured such that its inclination angle is adjustable. The land vehicle seat 12 is arranged in the passenger compartment such that the seat back 14 faces forward. The width direction of the thus arranged land vehicle seat 12 coincides with the vehicle width direction.

The internal structure of a lateral portion 14o on the outer side of the seat back 14 will now be described.

The seat back 14 incorporates a seat frame, which forms the framework. A part of the seat frame forms a side frame portion 15, which is located in the outer side lateral portion 14o of the seat back 14 as shown in FIG. 4. The side frame portion 15 is formed by bending a metal plate. A seat pad 16, which is made of an elastic material such as urethane foam, is provided in front of the seat frame, which includes the side frame portion 15. Also, a back board 17, which is made of, for example, a plastic, is arranged on the rear side of the seat frame. Although the seat pad 16 is covered with a cover, the cover is not illustrated in FIG. 4.

Figure 8:
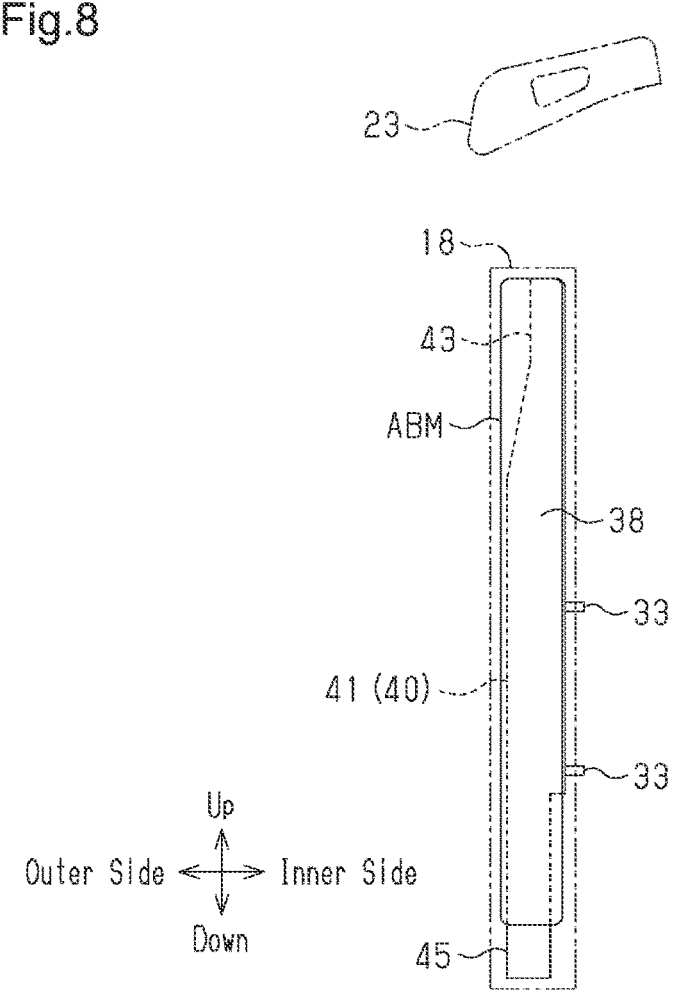
FIG. 8 is a front view showing the positional relationship of the airbag module, the pressure receiving member, and the seat belt guide of FIG. 3.

The seat pad 16 includes an accommodation portion 18 (see FIG. 8) in the outer side lateral portion 14o. The accommodation portion 18 is located at a position that is adjacent to and on the outer side of the side frame portion 15. The accommodation portion 18 is located beside an occupant P1 seated in the land vehicle seat 12. The accommodation portion 18 incorporates an airbag module ABM, which forms a main part of the side airbag apparatus.

A slit 19 is formed to extend from the outer front corner of the accommodation portion 18. The slit 19 extends diagonally forward and toward the outer side. The location between a front corner 16c and the slit 19 (the location surrounded by the long-dash double-short-dash line in FIG. 4) in the outer side lateral portion 14o of the seat pad 16 includes a breakable portion 21, which is designed to be broken by an airbag 35, which will be discussed below.

The land vehicle 10 has, in the passenger compartment, a seat belt device for restraining the occupant P1 seated on the land vehicle seat 12. Illustration of the seat belt device is omitted in FIGS. 1 to 3.

As shown in FIGS. 2, 3, 7, and 8, the seat back 14 is provided with a bracket 22 at the upper end of the outer side lateral portion 14o. A seat belt guide 23 is arranged above the accommodation portion 18 and on the outer side lateral portion 14o. The seat belt guide 23 is attached to the bracket 22 and is designed to guide a middle portion in the longitudinal direction of the seat belt (not shown) of the seat belt device to the front of the seat back 14.

As shown in FIG. 4, the airbag module ABM includes as its main components a gas generator 30, the airbag 35, and an airbag cover 38. Each of these components will now be described.

In the present embodiment, the up-down direction and the front-rear direction of the components of the airbag module ABM are defined with reference to the seat back 14 of the land vehicle seat 12. The direction in which the seat back 14 extends upward is defined as the up-down direction of the airbag module ABM and the like, and the thickness direction of the seat back 14 is defined as the front-rear direction of the airbag module ABM and the like. As described above, the seat back 14 is slightly inclined rearward. Thus, in a strict sense, the up-down direction of the airbag module ABM and the like does not agree with the up-down direction (vertical direction) of the land vehicle 10. Likewise, the up-down direction of the airbag module ABM and the like is slightly inclined relative to the up-down direction of the land vehicle 10 (the vertical direction). Also, the front-rear direction of the airbag module ABM and the like does not agree with the front-rear direction of the land vehicle 10 (the horizontal direction). That is, the front-rear direction of the airbag module ABM and the like is slightly inclined relative to the front-rear direction of the land vehicle 10 (the horizontal direction).

<Gas Generator 30>

Figure 5:
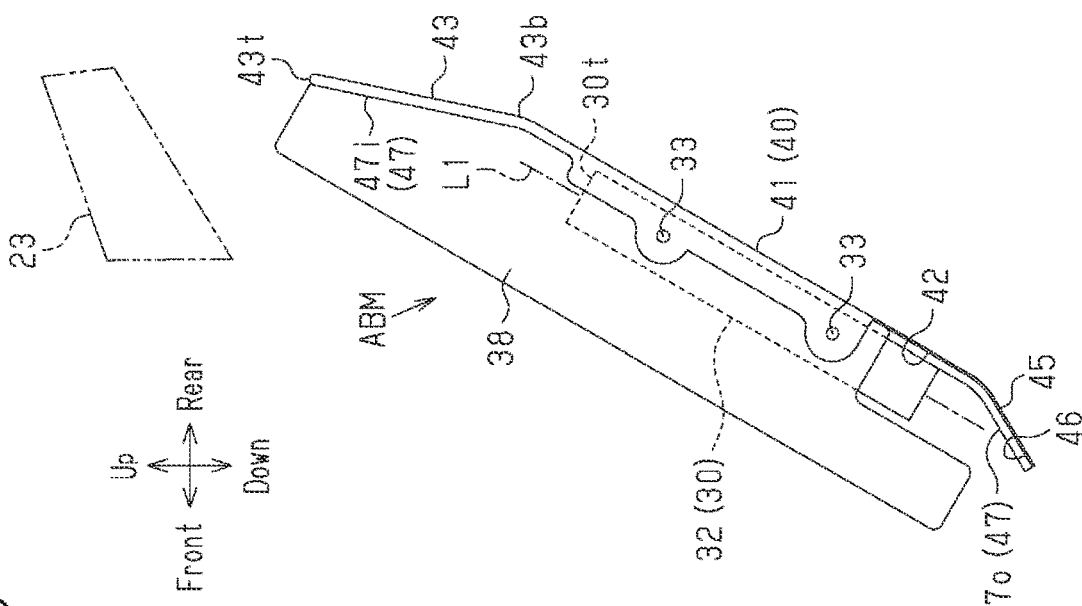
FIG. 5 is a side view showing the positional relationship of the airbag module, the pressure receiving member, and the seat belt guide of FIG. 1.

As shown in FIGS. 4 and 5, the gas generator 30 includes an inflator 31 and a retainer 32, which surrounds the inflator 31. The gas generator 30 has an elongated shape extending substantially in the up-down direction along an axis L1. A pyrotechnic type inflator is employed as the inflator 31. The inflator 31 is substantially columnar and accommodates a gas generating agent (not shown), which generates inflation gas. The inflator 31 has a gas outlet at the upper end. A harness (not shown), which is wiring for applying activation signals to the inflator 31, is connected to the lower end of the inflator 31.

In place of the pyrotechnic type inflator 31 using a gas generating agent, it is possible to use a hybrid type inflator, which ejects inflation gas by breaking a partition of a high-pressure gas cylinder filled with high-pressure gas using low explosive.

The retainer 32 forms an outer peripheral portion of the gas generator 30. The retainer 32 is used as a diffuser for controlling the direction of discharged inflation gas and also as a member for attaching the inflator 31 as well as the airbag 35 to the side frame portion 15. Most of the retainer 32 is formed by bending a plate such as a metal plate into a substantially cylindrical shape. The retainer 32 is partially swaged in the longitudinal direction such that its diameter is reduced, so as to be secured to the inflator 31.

Bolts 33 are fixed to the retainer 32. The bolts 33 serve as attaching members for attaching the retainer 32 to the side frame portion 15. The bolts 33 are spaced apart from each other in the up-down direction and protrude toward the inner side from the retainer 32. The direction in which each bolt 33 protrudes is a direction perpendicular to the axis L1.

The gas generator 30 may be formed by integrating the inflator 31 and the retainer 32. Further, the gas generator 30 may only include the inflator 31 to which the bolts 33 are fixed without using the retainer 32.

<Airbag 35>

Figure 11:
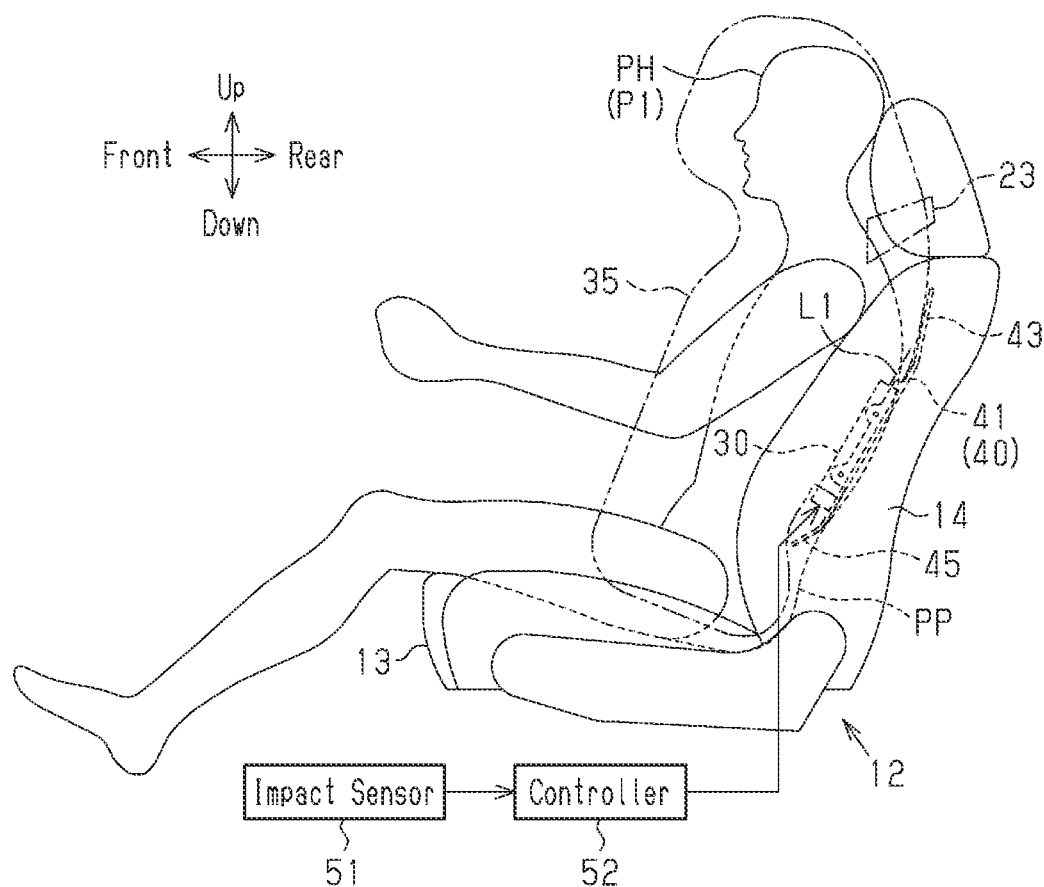
FIG. 11 is a side view illustrating a state in which the airbag of FIG. 1 has deployed and inflated.

As shown in FIGS. 2, 3, and 11, the airbag 35 is formed by folding forward a single fabric piece (also referred to as a base fabric or a fabric panel) in half along a folding line set at its center portion such that the fabric piece is overlapped with itself in the vehicle width direction. The overlapped portions are joined together, for example, by sewing to have a bag shape. The fabric piece is preferably formed of a material having high strength and flexibility to be easily folded. The material may be, for example, woven fabric formed of polyester threads or polyamide threads.

The shape and the size of the airbag 35 are determined such that the airbag 35 can protect most part of the upper body of the occupant P1 (the region including the lumbar region PP and the head PH in the present embodiment) when the airbag 35 deploys and inflates between the land vehicle seat 12 and the side wall 11.

The gas generator 30 is inserted into the rear end of the airbag 35 and inclined rearward such that the gas outlet is located at the upper end of the inflator 31. The gas outlet is located inside the airbag 35. The lower end and the harness of the gas generator 30 are exposed to the outside of the airbag 35.

The bolts 33 of the gas generator 30 are inserted through the fabric portion of the airbag 35 on the inner side. The bolts 33 being inserted through engage the gas generator 30 with the airbag 35 in a state in which the position is determined with respect to the airbag 35.

As shown in FIG. 4, the airbag 35 is made compact by folding the part forward of the gas generator 30, such that the airbag 35 is suitably stored in the accommodation portion 18, which has a limited size in the seat back 14. For example, roll-folding and accordion-folding are suitable as methods for folding the airbag 35. The roll-folding refers to a folding method in which most part of the airbag 35 is wrapped about an end. The accordion-folding refers to a folding method in which the airbag 35 is repeatedly folded by a constant width while alternating the folding direction.

A binding tape (not shown) is wrapped around each of the upper part and the lower part of the folded portion of the airbag 35. The binding tapes maintain the airbag 35 in a folded state.

<Airbag Cover 38>

Figure 6:
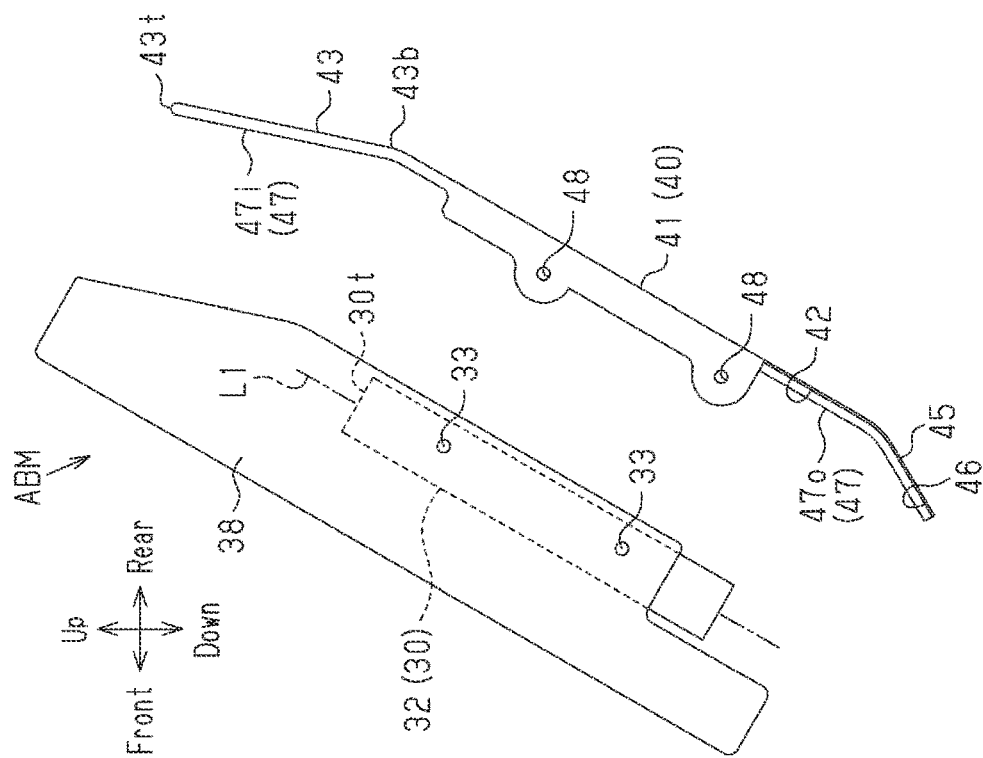
FIG. 6 is a side view showing a state in which the pressure receiving member has been removed from the airbag module in FIG. 5.

As shown in FIGS. 4 to 6, the airbag cover 38 encompasses the airbag 35, which accommodates the gas generator 30 and is in a folded state. The airbag cover 38 is designed to prevent the folded shape of the airbag 35 from being deformed (prevent the airbag 35 from being unfolded) w % ben the airbag module ABM is being carried or attached to the accommodation portion 18. The airbag cover 38 is also referred to as a wrapping cloth or a wrapping sheet. The airbag cover 38 is formed by several fabric pieces made of nonwoven fabric or the like. In the airbag cover 38, adjacent fabric pieces are joined to each other by joining peripheral edges together by a joining method such as heat welding.

The bolts 33 of the gas generator 30 are inserted through the airbag cover 38 in addition to being inserted through the airbag 35. The inserted bolts 33 are exposed to the outside of the airbag cover 38.

The part of the gas generator 30 that is exposed from the airbag 35 is not covered by the airbag cover 38 and is exposed from the airbag cover 38.

The airbag cover 38 includes a tear portion (not shown), which is pushed and torn by the airbag 35 when the airbag 35 deploys and inflates. The tear portion, for example, includes a slit formed in the airbag cover 38.

The side airbag apparatus includes a pressure receiving member 40 in addition to the above-described airbag module ABM.

<Pressure Receiving Member 40>

Figure 9:
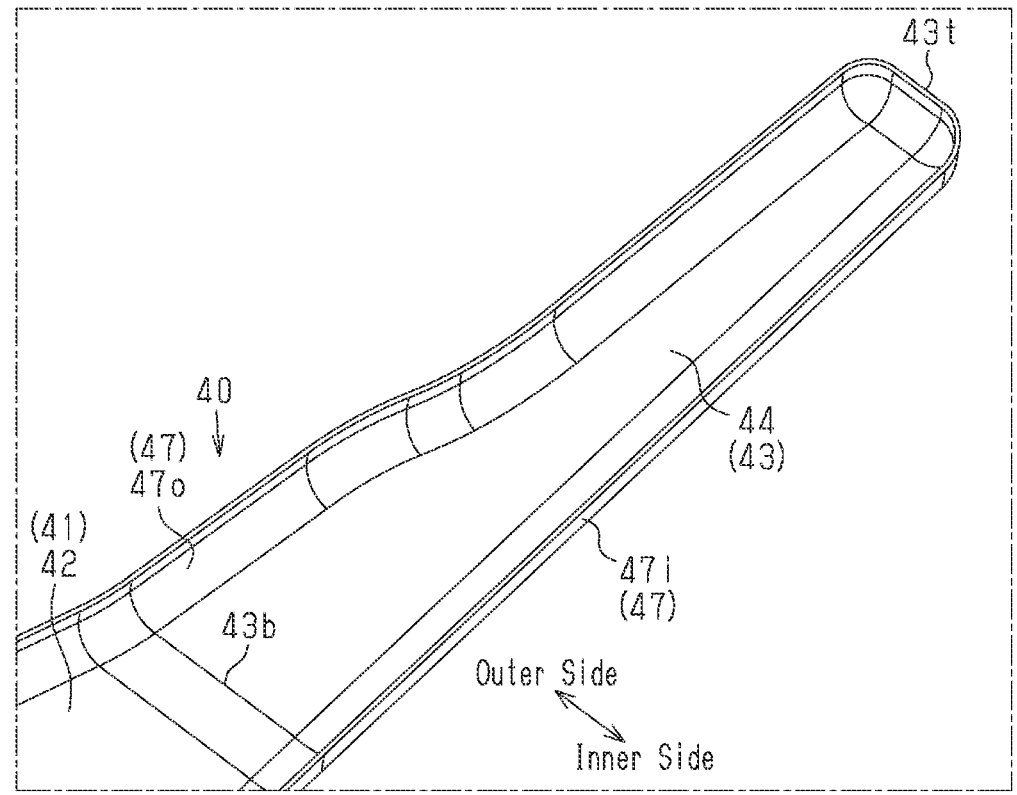
FIG. 9 is a partial perspective view showing an upper part of the pressure receiving member according to the embodiment.
Figure 10:
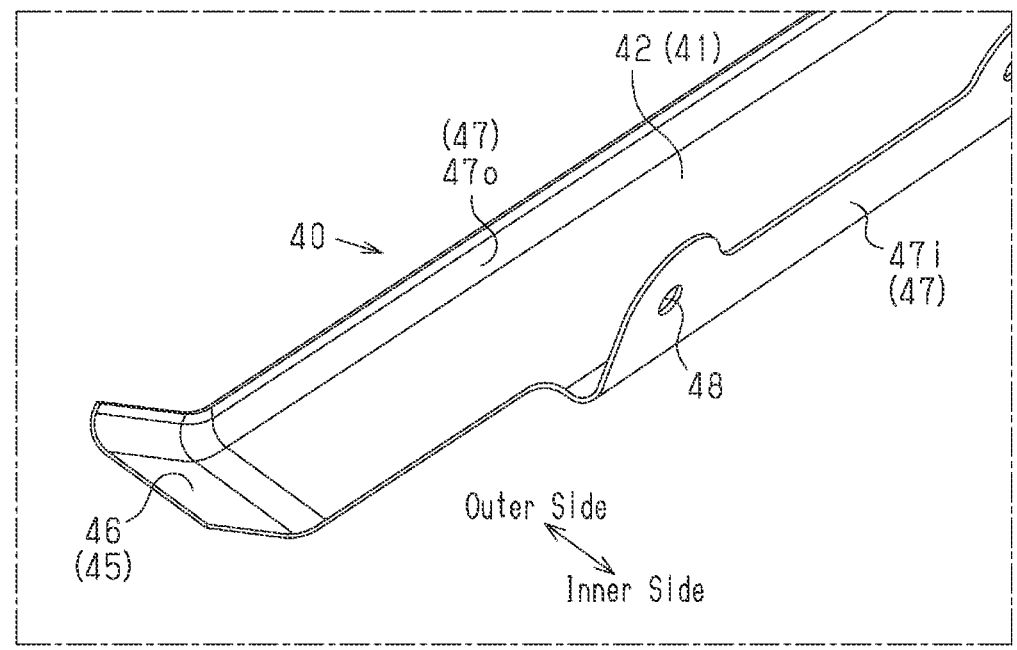
FIG. 10 is a partial perspective view showing a lower part of the pressure receiving member according to the embodiment.

The pressure receiving member 40, which is illustrated in FIGS. 5, 9, and 10, is designed to, for example, produce reaction force when receiving the pressure of the inflation gas through the deploying and inflating airbag 35. The pressure receiving member 40 is located outside the airbag cover 38. The pressure receiving member 40 includes a main body 41, an upper restricting portion 43, and a lower restricting portion 45 and is entirely made of a hard plastic.

The main body 41 forms the main part of the pressure receiving member 40 and is plate-shaped. The main body 41 includes a pressure receiving surface 42, which has a constant width in the vehicle width direction. The pressure receiving surface 42 extends along the axis L1 of the gas generator 30 (refer to FIG. 5). That is, the pressure receiving surface 42 is inclined relative to the vertical direction such that its upper end is located rearward of the its lower end. The main body 41 has a function of receiving the pressure of inflation gas in the airbag 35 on the pressure receiving surface 42 and producing reaction force in a direction perpendicular to the pressure receiving surface 42.

Figure 7:
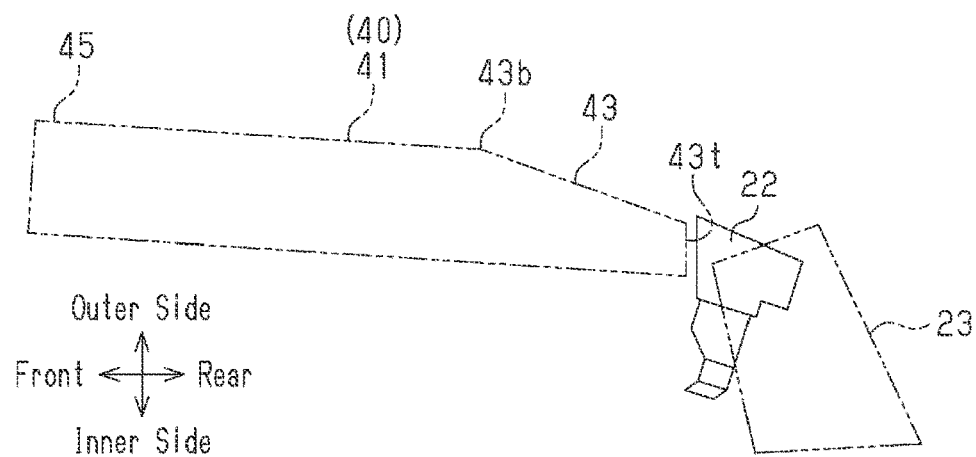
FIG. 7 is a plan view showing the positional relationship of the seat belt guide, the bracket, and the pressure receiving member in FIG. 2.

The upper restricting portion 43 is located above and adjacent to the main body 41 and is plate-shaped. The upper restricting portion 43 includes an upper restricting surface 44, which restricts upward deployment and inflation of the airbag 35. The upper restricting surface 44 is located forward of an imaginary upward extension of the pressure receiving surface 42. In the present embodiment, the upper restricting surface 44 is inclined relative to the axis L1 by a constant angle such that its upper end is farther forward from the axis L1 than its lower end. The upper restricting portion 43 is bent forward relative to the main body 41. Due to this bent shape, an upper end 43t of the upper restricting portion 43 is located forward of the seat belt guide 23 and the bracket 22 as shown in FIG. 7. Also, a boundary 43b between the upper restricting portion 43 and the main body 41 is located above an upper end 30t of the gas generator 30 as shown in FIGS. 5 and 6.

As shown in FIGS. 5, 6 and 10, the lower restricting portion 45 is located below and adjacent to the main body 41 and is plate-shaped. The lower restricting portion 45 includes a lower restricting surface 46, which restricts downward deployment and inflation of the airbag 35. The lower restricting surface 46 is located forward of an imaginary downward extension of the pressure receiving surface 42. In the present embodiment, the lower restricting surface 46 is inclined relative to the axis L1 by a constant angle such that its lower end is farther forward from the axis L1 than its upper end. The lower restricting portion 45 is bent forward relative to the main body 41.

As shown in FIGS. 9 and 10, the pressure receiving member 40 includes a reinforcing rib 47 on the most of the peripheral edge. The reinforcing rib 47 protrudes forward in the thickness direction of the pressure receiving member 40. The reinforcing rib 47 includes an inner rib portion 47i and an outer rib portion 47o. In the direction along the axis L1, the inner rib portion 47i is formed in a part of the edge of the pressure receiving member 40 that is located on the inner side in the vehicle width direction. In the present embodiment, the inner rib portion 47i is formed over the entire upper restricting portion 43 in the direction along the axis L1 and at a part of the main body 41 in the direction along the axis L1 (except for the lower part). In the direction along the axis L1, the outer rib portion 47o is formed over the entire edge of the pressure receiving member 40 that is located on the outer side in the vehicle width direction. That is, in the direction along the axis L1, the outer rib portion 47o is formed over the entire main body 41, the entire upper restricting portion 43, and the entire lower restricting portion 45.

As shown in FIGS. 6 and 10, the main body 41 includes bolt holes 48 in the inner rib portion 47i. The bolt holes 48 are spaced apart from each other in the direction along the axis L1.

The pressure receiving member 40 is attached to the airbag module ABM from the rear in a state in which the airbag module ABM is held between the inner rib portion 47i and the outer rib portion 47o, and the pressure receiving surface 42, the upper restricting surface 44, and the lower restricting surface 46 are close to or in contact with the rear surface of the airbag module ABM. In this state, the bolts 33, which are inserted through the airbag 35 and the airbag cover 38, are inserted through the corresponding bolt holes 48 of the inner rib portion 47i.

As shown in FIGS. 4 and 5, the airbag module ABM and the pressure receiving member 40 are arranged in the accommodation portion 18 with the pressure receiving member 40 located rearward of the airbag module ABM. The bolts 33, which extend from the gas generator 30 and are inserted through the airbag 35, the airbag cover 38, and the pressure receiving member 40, are inserted through the side frame portion 15 from the outer side. Nuts 34 are threaded to the bolts 33 from the inner side. The threading secures the gas generator 30 in an upright state to the side frame portion 15 together with the airbag 35, the airbag cover 38, and the pressure receiving member 40. The upright state includes not only a vertical state, but also a rearwardly inclined state.

The gas generator 30 may be attached to the side frame portion 15 using members other than the bolts 33 and the nuts 34. The inflator 31 may be directly attached to the side frame portion 15 without using the retainer 32.

The side airbag apparatus further includes an impact sensor 51 and a controller 52 shown in FIGS. 1 and 11. The impact sensor 51 includes an acceleration sensor and detects an impact force applied to the land vehicle 10 via the side wall 11 from the side. The controller 52 controls operation of the gas generator 30 based on a detection signal from the impact sensor 51.

The side airbag apparatus of the present embodiment is constructed as described above. Operation and advantages of the side airbag apparatus in each situation will now be described.

<Inactive State of Side Airbag Apparatus>

When the impact sensor 51 is not detecting any impact force on the side wall 11 from the side, the controller 52 does not output to the gas generator 30 an activation signal for activating the gas generator 30. The gas generator 30 thus does not discharge inflation gas. The airbag 35, which accommodates the gas generator 30, continues to be accommodated in the accommodation portion 18 in a folded state.

<Activate State of Side Airbag Apparatus>

In contrast, when the impact sensor 51 detects that an impact force of a magnitude greater than or equal to a predetermined value has been applied to the side wall 11 from the side due to a side collision or the like while the land vehicle 10 is traveling, the controller 52, on the basis of the detection signal, outputs the activation signal to the gas generator 30. In response to the activation signal, the gas generator 30 generates inflation gas. When supplied with the inflation gas, the airbag 35 inflates while being unfolded (deploying). The airbag cover 38 is pushed by the inflating airbag 35 and is broken at the tear portion. The airbag 35 projects to the outside of the airbag cover 38 from the broken part.

As shown in FIG. 5, when the inflation gas is supplied from the gas generator 30, the pressure of the inflation gas is received by the pressure receiving surface 42 in a section of the airbag 35 that is located forward of the main body 41 of the pressure receiving member 40 (refer to FIGS. 9 and 10). This produces reaction force directed in a direction perpendicular to the pressure receiving surface 42.

The gas generator 30, which extends along the axis L1, is incorporated in an upright state in the accommodation portion 18, and the pressure receiving surface 42 extends along the axis L1. Thus, reaction force directed forward, which is a direction perpendicular to the pressure receiving surface 42, is produced in a section of the airbag 35 that is located forward of the main body 41 of the pressure receiving member 40.

The inflation of the airbag 35 takes place while unfolding the airbag 35 in reverse order to the order when the airbag 35 was folded. The airbag 35, which deploys and inflates forward, pushes the seat pad 16 of the seat back 14, so that the seat pad 16 is broken at the breakable portion 21 (refer to FIG. 4). The airbag 35 projects forward from the seat back 14 through the broken portion with part of the airbag 35 remaining in the accommodation portion 18.

In the pressure receiving member 40, if the upper restricting portion 43 were not provided above the main body 41, the airbag 35 would not be restricted from deploying and inflating upward, although it would be restricted from deploying and inflating rearward by the main body 41. Thus, while deploying and inflating upward, the airbag 35 contacts the bracket 22, which is arranged at the upper end in the outer side lateral portion 14o, and the seat belt guide 23, which is attached, via the bracket 22, to the outer side lateral portion 14o at a location above the accommodation portion 18. Further, since the space between the side wall 11 and the seat belt guide 23 is narrow, the airbag 35 that has contacted the seat belt guide 23 does not easily continue to deploy and inflate upward through the space to deploy and inflate to a position beside the head PH, which is located above the seat belt guide 23.

In this respect, the upper restricting portion 43 is located above and adjacent to the main body 41 of the pressure receiving member 40 as shown in FIG. 5 in the present embodiment. The upper restricting portion 43 is located below the bracket 22 and the seat belt guide 23. The upper restricting surface 44 of the upper restricting portion 43 is located forward of an imaginary upward extension of the pressure receiving surface 42. Thus, the section of the airbag 35 that is located forward of the upper restricting portion 43 of the pressure receiving member 40 and tends to deploy and inflate upward is restricted from continuing to deploy and inflate upward by the upper restricting surface 44 before reaching the bracket 22 and the seat belt guide 23.

In the present embodiment, the upper end 43t of the upper restricting portion 43 is located forward of the bracket 22 and the seat belt guide 23 (refer to FIG. 7). Thus, the section of the airbag 35 that is located forward of the upper restricting portion 43 of the pressure receiving member 40 and tends to deploy and inflate upward is restricted from continuing to deploy and inflate upward by the upper restricting portion 43 to a position forward of the bracket 22 and the seat belt guide 23.

The above-described section of the airbag 35 is restricted from passing through the narrow space between the seat belt guide 23 and the side wall 11 by the upper restricting portion 43.

Particularly, the upper restricting surface 44 is inclined relative to the axis L1 by a constant angle such that its upper end is farther forward from the axis L1 than its lower end in the present embodiment. Thus, the section of the airbag 35 that is located forward of the upper restricting portion 43 of the pressure receiving member 40 and tends to deploy and inflate upward is restricted from continuing to deploy and inflate upward by the upper restricting surface 44 before reaching the bracket 22 and the seat belt guide 23. The direction of deployment and inflation of the above-described section of the airbag 35 is changed from an upward direction to a forward direction.

The above-described section of the airbag 35 deploys and inflates forward through the space below the seat belt guide 23. That is, the above-described section of the airbag 35 deploys and inflates forward without passing through the narrow space between the seat belt guide 23 and the side wall 11. After passing through the space below the seat belt guide 23, the above-described section of the airbag 35 deploys and inflates upward, thereby deploying and inflating to a position beside the head PH, which is above the seat belt guide 23.

In the present embodiment, the pressure receiving member 40 includes the inner rib portion 47i and the outer rib portion 47o at the opposite edges in the vehicle width direction as shown in FIGS. 9 and 10. This configuration increases the shape stiffness of the pressure receiving member 40 as compared to a case in which the inner rib portion 47i and the outer rib portion 47o are not provided. The pressure receiving member 40 thus resists deformation when receiving the pressure of the inflation gas in the airbag 35.

The inner rib portion 47i and the outer rib portion 47o of the reinforcing rib 47 restrict the airbag 35 from deploying and inflating in the vehicle width direction.

Thus, the pressure receiving surface 42 of the main body 41 starts receiving the pressure of the inflation gas at an earlier stage than in a case in which the restriction is not performed by the inner rib portion 47i and the outer rib portion 47o. Accordingly, reaction force in a direction perpendicular to the pressure receiving surface 42 is produced at an early stage. The section of the airbag 35 that is located forward of the main body 41 deploys and inflates forward at an earlier stage than in a case in which the restriction is not performed by the inner rib portion 47i and the outer rib portion 47o.

The section of the airbag 35 that is located forward of the upper restricting portion 43 is restricted from continuing to deploy and inflate upward by the upper restricting surface 44 of the upper restricting portion 43 at an earlier stage than in a case in which the restriction is not performed by the inner rib portion 47i and the outer rib portion 47o. Thus, the direction of deployment and inflation of the above-described section of the airbag 35 is changed from an upward direction to a forward direction at an earlier stage than in a case in which the restriction by the inner rib portion 47i and the outer rib portion 47o is not performed. The section thus deploys and inflates forward at an early stage below the seat belt guide 23, and deploys and inflates upward after passing below the seat belt guide 23.

Subsequently, the airbag 35, which continues being supplied with the inflation gas, deploys and inflates forward between the side wall 11 and the upper body of the occupant P1 seated in the land vehicle seat 12 as indicated by the long-dash double-short-dash lines in FIGS. 2, 3, and 11. The upper body of the occupant P1 (the region including the lumbar region PP and the head PH) is pushed and restrained by the deployed and inflated airbag 35. As a result, the side impact force transmitted through the side wall 11 is reduced by the airbag 35, so that the upper body is protected.

In addition to the ones listed above, the present embodiment has the following advantages.

In the present embodiment, the airbag module ABM is formed by covering the airbag 35, which accommodates the gas generator 30 and is in a folded state, with the airbag cover 38. The airbag module ABM is installed in the accommodation portion 18 while being arranged forward of the pressure receiving member 40. This allows the airbag cover 38 to be easily broken by the airbag 35, which deploys and inflates while being restricted from deploying and inflating in the vehicle width direction by the reinforcing rib 47.

In the present embodiment, the pressure receiving member 40 is attached to the side frame portion 15 of the seat frame. Accordingly, the pressure receiving member 40 is firmly fixed in the seat back 14. This allows the pressure receiving surface 42 of the main body 41 to effectively receive the pressure of the inflation gas and to produce reaction force directed forward. This also allows the upper restricting surface 44 of the upper restricting portion 43 to effectively restrict upward deployment and inflation of the airbag 35.

The above-described embodiment may be modified as follows.

<Regarding Gas Generator 30>

The gas generator 30 may be arranged in any manner different from that in the above-described embodiment with respect to the airbag 35 as long as at least the gas outlet is arranged inside the airbag 35. For example, the entire gas generator 30, which includes the gas outlet, may be accommodated in the airbag 35.

<Regarding Airbag 35>

Substantially the entire airbag 35 may be configured to be inflated as in the above-described embodiment, but may also partially include a non-inflation portion, which is neither supplied with inflation gas nor inflated.

The inside of the airbag 35 may be divided into two or more chambers (inflation chambers).

The region of the upper body of the occupant P1 to be protected by the airbag 35 may be changed from that in the above-described embodiment, as long as the region includes the head PH. In this case, the shape and the size of the airbag 35 are changed to a shape and a size that can protect the target region of the upper body of the occupant P1.

<Regarding Airbag Cover 38>

The airbag cover 38 may have open opposite ends in the longitudinal direction when covering the airbag 35.

The airbag cover 38 may be omitted.

<Regarding Pressure Receiving Member 40>

The pressure receiving member 40 may be made of a hard material different from plastic. For example, the pressure receiving member 40 may be made of metal if the problem of damaging the airbag 35 with burrs is resolved.

The upper restricting surface 44 of the upper restricting portion 43 may be a surface other than a flat surface. For example, the upper restricting surface 44 may be a curved surface. The upper restricting surface 44 may include two or more flat surfaces.

The upper end 43t of the upper restricting portion 43 may be located below or rearward of the front end of the seat belt guide 23. The upper end 43t may be located below or rearward of the front end of the bracket 22.

Even in these cases, the section of the airbag 35 that is located forward of the upper restricting portion 43 of the pressure receiving member 40 and tends to deploy and inflate upward is restricted from continuing to deploy and inflate upward before reaching the bracket 22 or the seat belt guide 23, so that the direction of deployment and inflation is changed from the upward direction to the forward direction.

The reinforcing rib 47 may include only one of the inner rib portion 47i or the outer rib portion 47o. Like the outer rib portion 47o, the inner rib portion 47i may be formed over the entire edge on the inner side of the pressure receiving member 40 in the direction along the axis L1. Also, like the inner rib portion 47i, the outer rib portion 47o may be formed on a part of the edge on the outer side of the pressure receiving member 40 in the direction along the axis L1.

In any of the above-described modifications, the shape stiffness of the pressure receiving member 40 is increased as compared to a case in which the reinforcing rib 47 is not provided.

The reinforcing rib 47 may be formed to protrude, in the rearward direction along the thickness of the pressure receiving member 40, from an edge in the width direction of the pressure receiving member 40 instead of or in addition to the forward direction along the thickness of the pressure receiving member 40. In this case also, the shape stiffness of the pressure receiving member 40 is increased by the reinforcing rib 47.

<Regarding Applicability>

The above-described side airbag apparatus can be employed not only in the front seat of the land vehicle 10, but also in a rear seat. In this case, a part of the side wall 11 that corresponds to the rear seat includes a rear part of a side door (rear door), a C-pillar, a front part of a wheel well, and a rear quarter panel.

The land vehicle 10, for which the above-described side airbag apparatus is employed, includes various industrial vehicles in addition to private cars.

The above-described side airbag apparatus may also be employed as an airbag apparatus installed in vehicle seats in vehicles other than the land vehicle 10, for example, in seats of aircrafts and ships.

<Other Modifications>

The controller 52 may be changed to have a configuration in which an activation signal is output to the inflator 31 when it is predicted that a side impact force will be applied to the side wall 11 of the land vehicle 10.

The invention claimed is:

1. A side airbag apparatus, wherein
the side airbag apparatus is employed in a vehicle seat that includes a seat back and a seat belt guide attached to the seat back,
the seat back includes an accommodation portion in a lateral portion on an outer side,
the seat belt guide is attached to the lateral portion at a location above the accommodation portion,
the side airbag apparatus, comprising:
a gas generator that extends along an axis, is installed in an upright state in the accommodation portion, and generates inflation gas in response to an impact force applied to a side wall of a vehicle from a side;
an airbag that is installed in a folded state in the accommodation portion and inflates with the inflation gas supplied from the gas generator so as to deploy and inflate between an occupant seated in the vehicle seat and the side wall with a part of the airbag remaining in the accommodation portion; and
a pressure receiving member arranged rearward of the airbag in the accommodation portion,
the pressure receiving member includes
a main body that includes a pressure receiving surface extending along the axis and receives pressure of the inflation gas in the airbag to produce a reaction force in a direction perpendicular to the pressure receiving surface, and
an upper restricting portion that is located above and adjacent to the main body and includes an upper restricting surface located forward of an imaginary upward extension of the pressure receiving surface, the upper restricting portion restricting upward deployment and inflation of the airbag using the upper restricting surface, and
the upper restricting surface is inclined relative to the axis by a constant angle such that its upper end is farther forward from the axis than its lower end, restricts upward deployment and inflation of the airbag before the airbag reaches the seat belt guide, and causes the airbag to deploy and inflate to a position above the seat belt guide.

2. The side airbag apparatus according to claim 1, further comprising a reinforcing rib that is formed at least in a part, in a direction along the axis, of at least one of opposite edges of the pressure receiving member in a width direction of the vehicle seat, the reinforcing rib protruding in a thickness direction of the pressure receiving member.

3. The side airbag apparatus according to claim 2, wherein the reinforcing rib protrudes forward in the thickness direction from opposite edges of the main body in the width direction and from opposite edges of the upper restricting portion in the width direction, and the airbag is arranged between portions of the reinforcing rib in the width direction before being supplied with the inflation gas from the gas generator.

4. The side airbag apparatus according to claim 1, wherein the upper restricting portion includes an upper end that is located forward of the seat belt guide.

* * * * *